(12) United States Patent
Hendriks et al.

(10) Patent No.: US 7,034,974 B2
(45) Date of Patent: Apr. 25, 2006

(54) OPTICAL SCANNING DEVICE INCLUDING A TILT TOLERANT OBJECTIVE SYSTEM

(75) Inventors: Bernardus Hendrikus Wilhelmus Hendriks, Eindhoven (NL); Marco Andreas Jacobus Van As, Eindhoven (NL); Teunis Willem Tukker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/518,254

(22) PCT Filed: Jun. 23, 2003

(86) PCT No.: PCT/IB03/02422

§ 371 (c)(1),
(2), (4) Date: Dec. 16, 2004

(87) PCT Pub. No.: WO04/001732

PCT Pub. Date: Dec. 31, 2003

(65) Prior Publication Data

US 2005/0207028 A1    Sep. 22, 2005

(30) Foreign Application Priority Data

Jun. 25, 2002   (EP) .................................. 02077514

(51) Int. Cl.
*G02B 26/08*   (2006.01)

(52) U.S. Cl. .................. 359/210; 359/719; 369/11.23; 369/112.24

(58) Field of Classification Search ................ 359/719, 359/656, 754, 796, 368, 369; 369/112.23, 369/112.24, 112.25, 99, 112.01

See application file for complete search history.

(56) References Cited

U.S. PATENT DOCUMENTS 5,726,436 A * 3/1998 Oka et al. ................. 250/201.5
6,052,237 A * 4/2000 Opheij et al. ............... 359/719

* cited by examiner

*Primary Examiner*—Euncha P. Cherry
*Assistant Examiner*—Pranav Khatri
(74) *Attorney, Agent, or Firm*—Edward Goodman (57) ABSTRACT

An optical scanning device (1) for scanning an information layer (4) of an optical record carrier (2), the device including a radiation source (11) for generating a radiation beam (12) and an objective system (18) for converging the radiation beam (12) on the information layer, the objective system (18) being characterized in that the ratio of the root mean square of the optical path difference's (OPD's) generated by the objective system at oblique beam entrance to the system satisfies the condition of formula (I) within the field of the objective system, where OPD(A31) is the contribution of the third order Zernike coma to the root mean square wavefront aberration and OPD(A51) is the contribution of the fifth order Zernike coma to the root mean square wavefront aberration.

11 Claims, 3 Drawing Sheets

FIG.4

OPTICAL SCANNING DEVICE INCLUDING A TILT TOLERANT OBJECTIVE SYSTEM

FIELD OF THE INVENTION

The present invention relates to an optical scanning device for scanning an optical record carrier, to a lens system suitable for, but not limited to, use as an objective lens in such a scanning device, and to methods for manufacturing such a device and such a system.

BACKGROUND TO THE INVENTION

In optical recording, an increase in the information density on the optical record carrier must be accompanied by a smaller radiation spot for scanning the information. Such a smaller spot can be realised by increasing the numerical aperture (NA) of the objective system used for focusing a radiation beam in the scanning device on the record carrier. Examples of optical record carriers include CD's (Compact Discs) and DVD's (Digital Versatile Discs).

The radiation spot can never be a perfect point, due to diffraction limits. However, in such optical recording systems, it is desirable that the spot is limited by diffraction, and not by the effect of aberrations. Typically, an allowance in the root mean square of the optical path difference (OPD) of approximately 0.07λ, (where λ is the wavelength of the relevant radiation beam) in total is allowed for wavefront aberrations, such that the system is diffraction limited. It can be convenient to express the OPD in mλ (where 0.001 λ=1 mλ). A budget of approximately 30–40 mλ of aberration is permitted for the total wavefront aberration of the objective lens system from this total allowance, of which 15 mλ is allowed for the effects of coma. Other portions of the recording system and effects (e.g. temperature, wavelength error, misalignment of other components) will contribute to the total amount of aberration.

Many optical recording (and optical reading) systems have one or more additional beam spots focused on the optical record carrier adjacent to the central beam spot used for writing to (or reading from) the record carrier. Such additional spots are typically utilised to provide information on the positioning of the scanning (e.g. reading or writing) radiation spot on the record carrier. One example of such a system is the "three-spots push-pull" system, which has two auxiliary spots, one on either side of the main reading or writing spot. These additional spots are used to ensure that the central spot is in focus and in the desired position (e.g. on the desired track) of the carrier. The main spot is normally arranged on the optical axis of the objective system, and so it will be appreciated that the radiation beams forming the neighbouring spots will enter the objective lens system obliquely.

When assembling optical systems, it is important that the objective lens must not only be positioned correctly, but also orientated (i.e. tilted) correctly with respect to both the optical axis of the optical system and to the record carrier, so as to minimise the effect of aberrations, including coma.

Preferably, the optical axis of the objective lens system is aligned with the optical axis of the optical system (i.e. the collimated radiation beam), and perpendicular to the surface of the record carrier.

If the optical axis of the radiation beam incident on the record carrier is not normal to the record carrier, then coma will be induced in the beam as the beam passes through the transparent covering layer. Many optical recording carriers are not completely flat, but may be warped. Thus, as the radiation beam scans across the surface of the record carrier, it will encounter different areas of the surface which are tilted away from the preferred orientation. In order to compensate for the coma arising from such different tilts of the record carrier (e.g. a range of disk tilt), it is known to actively tilt the objective lens using an actuating unit.

Conventional lens designs are limited to a relatively small range of tilt compensation. Three-spots push-pull systems are particularly limited, due to the coma intrinsically arising due to the auxiliary spots entering the objective lens system obliquely even when the optical axis of the central scanning beam is arranged on the optical axis of the objective system.

It is an aim of embodiments of the present invention to provide an optical system which improves the range of disk tilt compensation that can be achieved by tilting the objective lens system.

SUMMARY OF THE INVENTION

In a first aspect, the present invention provides an optical scanning device (1) for scanning an information layer (4) of an optical record carrier (2), the device (1) comprising a radiation source (11) for generating a radiation beam (12, 15, 17, 20) and an objective system (18) for converging the radiation beam on the information layer, the objective system (18) being characterised in that the ratio of the root mean square of the optical path difference's (OPD's) generated by the objective system at oblique beam entrance to the system satisfies the condition:

$$\frac{OPD(A51)}{OPD(A31)} < 0.65$$

within the field of the objective system (18), where OPD (A31) is the contribution of the third order Zernike coma to the root mean square wavefront aberration and OPD(A51) is the contribution of the fifth order Zernike coma to the root mean square wavefront aberration.

In a further aspect, the present invention provides a lens system (18) comprising at least one lens for focusing a radiation beam, characterised in that the ratio of the root mean square of the optical path difference's (OPD's) generated by the lens system at oblique beam entrance to the system satisfies the condition:

$$\frac{OPD(A51)}{OPD(A31)} < 0.65$$

within the field of the lens system, where OPD(A31) is the contribution of the third order Zernike coma to the root mean square wavefront aberration and OPD(A51) is the contribution of the fifth order Zernike coma to the root mean square wavefront aberration.

In another aspect, the present invention provides a method for manufacturing a lens system (18) comprising at least one lens for focusing a radiation beam (17), the method comprising the step of: forming said lens system such that the ratio of the root mean square of the optical path difference's (OPD's) generated by the lens system at oblique beam entrance to the system satisfies the condition:

$$\frac{OPD(A51)}{OPD(A31)} < 0.65$$

within the field of the lens system, where OPD(A31) is the contribution of the third order Zernike coma to the root mean square wavefront aberration and OPD(A51) is the contribution of the fifth order Zernike coma to the root mean square wavefront aberration.

In a further aspect the present invention provides a method of manufacturing an optical scanning device (1) for scanning an information layer (4) of an optical record carrier (2), the method comprising the steps of:

providing a radiation source (11) for generating a radiation beam; providing a lens system (18) for converging the radiation beam on the information layer (4), the lens system (18) being characterised in that the ratio of the root mean square of the optical path difference's (OPD's) generated by the lens system at oblique beam entrance to the system satisfies the condition:

$$\frac{OPD(A51)}{OPD(A31)} < 0.65$$

within the field of the lens system, where OPD(A31) is the contribution of the third order Zernike coma to the root mean square wavefront aberration and OPD(A51) is the contribution of the fifth order Zernike coma to the root mean square wavefront aberration.

Other aspects of the invention will be apparent from the dependent claims.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENTS

Figure 1:
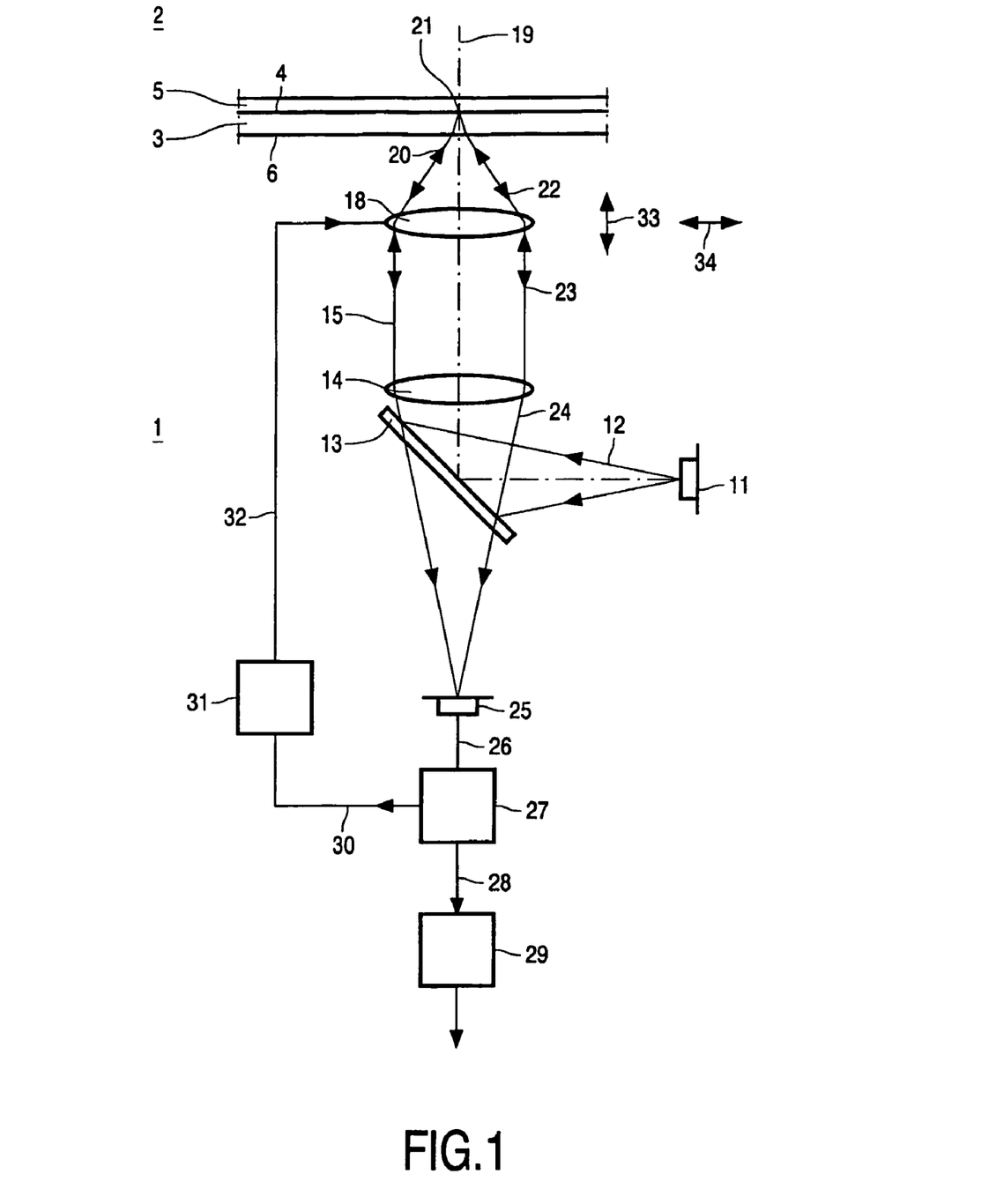
FIG. 1 shows a device for scanning an optical record carrier including an objective system.

FIG. 1 shows a device 1 for scanning an optical record carrier 2. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot.

The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 1 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

It will be appreciated that the present invention can be realised in respect of a single lens, or a lens system comprising a plurality of lenses.

Figure 2A:
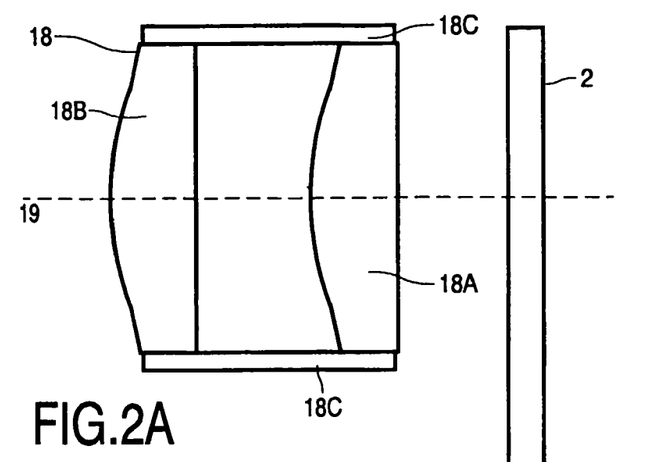
FIG. 2A shows an objective system comprising two plano-aspherical elements.

For instance, FIG. 2A illustrates an objective lens system 18 comprising two separate lens elements 18A, 18B. Each element 18A, 18B in this example is a plano-aspherical lens. The two elements are held in fixed relationship with respect to one another by the use of a lens holder 18C.

Figure 2B:
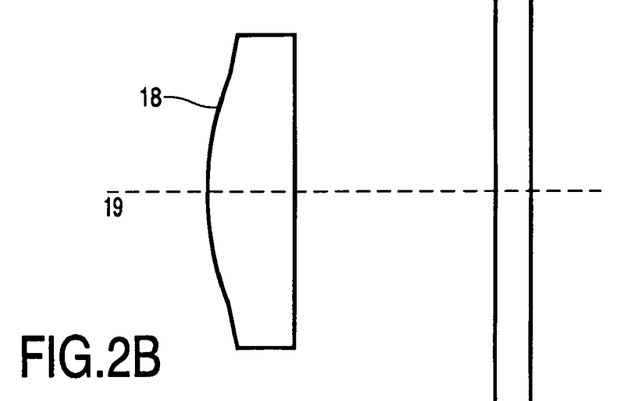
FIG. 2B shows an objective system comprising a single plano-aspherical element.
Figure 2C:
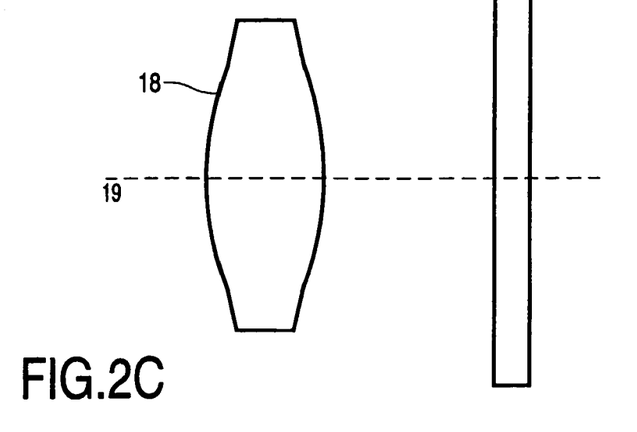
FIG. 2C shows an objective system comprising a double-aspherical element.
Figure 3:
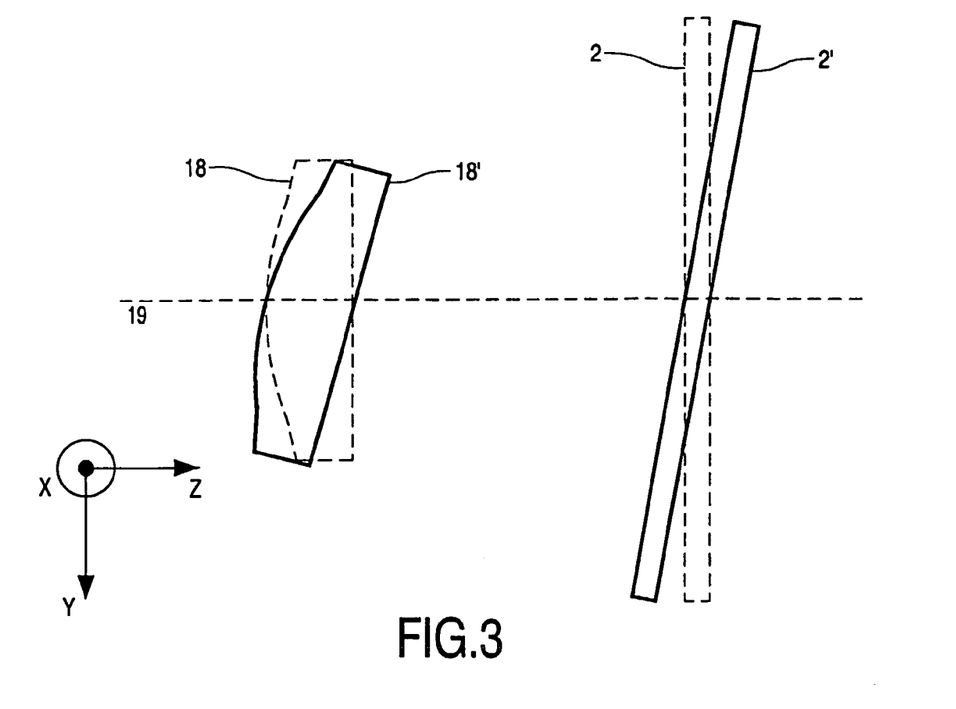
FIG. 3 illustrates how the lens system and/or the carrier can be tilted.

Equally, the present invention could be implemented by other types of lens, or other lens configurations, such as the single plano-aspherical lens 18 shown in FIG. 2B, or the double-aspherical lens 18 shown in FIG. 2C. For ease of reference, a single recording medium 2 is indicated in respect of all of the FIGS. 2A–2C. In each of these diagrams, the Y and Z axis are assumed to be within the plane of the page, with the X axis protruding from the page. Normally, the optical axis of the lens is perpendicular to the surface of the recording medium 2. However, as indicated in FIG. 3, either the objective lens 18', or the recording medium 2' could be tilted away from their normal ideal positions (18, 2) by rotation about the X-axis and/or the Y-axis. FIG. 3 shows examples in which both the lens and the recording medium are tilted about the X-axis.

The amount of wavefront aberration present in a radiation beam can be expressed by the aberration function $\Phi(\rho,\theta)$, where $\rho, \theta$ are spherical coordinates, with $\rho$ the normalised pupil radius and $\theta$ the angular coordinate. This aberration function can be represented in terms of Zernike polynomials. Zernike functions are for instance described within the well known reference book "Principals of Optics", by Max Born & Emil Wolf. The wavefront aberration function $\Phi(\rho,\theta)$ can then be expressed by $$\Phi(\rho, \theta) = A_{00} + \frac{1}{\sqrt{2}} \sum_{n=2}^{\infty} A_{n0} R_n^0(\rho) + \sum_{n=1}^{\infty} \sum_{m=1}^{\infty} A_{nm} R_n^m(\rho) \cos m\theta$$

where $A_{nm}$ are the Zernike coefficients, $R_n^m(\rho)$ are the radial polynomials (see section 9.2 of the book "Principals of Optics", by University Press, Cambridge, reprinted with corrections, 2002). The expansion term corresponding to third order Zernike coma is given by $$\Phi_{31}(\rho,\theta) = A_{31}(3\rho^3 - 2\rho)\cos\theta$$

and the expansion term corresponding to fifth order Zernike coma is given by $$\Phi_{51}(\rho,\theta) = A_{51}(10\rho^5 - 12\rho^3 + 3\rho)\cos\theta$$

The root mean square of the wavefront aberration OPD is defined by $$OPD = \left( \frac{\int_0^1 \int_0^{2\pi} \Phi(\rho, \theta)^2 \rho d\rho d\theta - \left( \int_0^1 \int_0^{2\pi} \Phi(\rho, \theta) \rho d\rho d\theta \right)^2}{\int_0^1 \int_0^{2\pi} \rho d\rho d\theta} \right)^{1/2}$$

The contribution of the third order Zernike coma OPD(A31) to the root mean square wavefront aberration is then given by $$OPD(A31) = \left( \frac{\int_0^1 \int_0^{2\pi} \Phi_{31}(\rho, \theta)^2 \rho d\rho d\theta - \left( \int_0^1 \int_0^{2\pi} \Phi_{31}(\rho, \theta) \rho d\rho d\theta \right)^2}{\int_0^1 \int_0^{2\pi} \rho d\rho d\theta} \right)^{1/2}$$

and the contribution of the fifth order Zernike coma OPD (A51) by $$OPD(A51) = \left( \frac{\int_0^1 \int_0^{2\pi} \Phi_{51}(\rho, \theta)^2 \rho d\rho d\theta - \left( \int_0^1 \int_0^{2\pi} \Phi_{51}(\rho, \theta) \rho d\rho d\theta \right)^2}{\int_0^1 \int_0^{2\pi} \rho d\rho d\theta} \right)^{1/2}$$

Conventional objective lenses are designed so as to have a reasonable field of view performance. This means that the generation of lowest order coma is suppressed as much as possible for any oblique beam entrance.

The present inventors have realised that as a result of the lowest order coma being suppressed, the maximum allowed field angle of the lens system is substantially limited by higher order coma terms.

Coma arises in a beam entering a tilted disk, due to the non-symmetrical passage of the beam through the cover layer. A relatively large amount of lowest order coma aberration arises and only a small amount of higher order coma. Consequently, when compensating for tilt misalignment of the objective by tilting the disk, only a moderate tilt misalignment of the objective can be allowed because the higher order coma terms do not significantly cancel each other.

Figure 4:
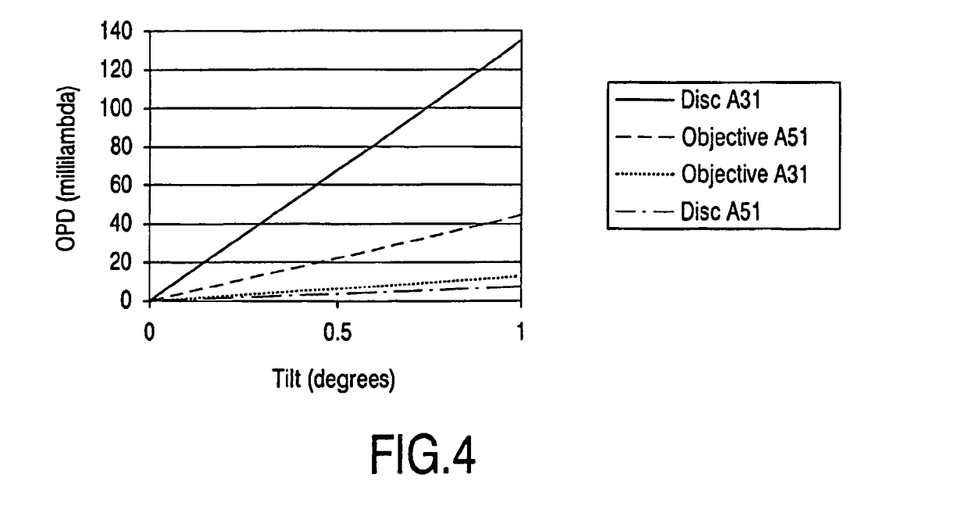
FIG. 4 is a graph indicating typical OPD's arising from different Zernike terms due to coma of a beam caused respectively by the tilt of a disk and by the tilt of a conventional lens design.

FIG. 4 illustrates a graph showing the amount of coma arising for the different A31 and A51 Zernike terms for different amounts of tilt of respectively a disk (i.e. a record carrier) and for a conventional objective lens system. Tilt angles of the disk and the objective of up to 1° away from the idealised orientation are considered. Within this range of tilt, the root means square optical path difference arising in respect of each of the A31 and A51 Zernike terms is substantially proportional (i.e. linear) with respect to the amount of tilt.

As can seen, for a typical disk at 1° of tilt, the A31 term provides an OPD of approximately 135 m$\lambda$, and the A51 term provides an OPD of approximately 7.5 m$\lambda$. In contrast, due to the lowest order coma being suppressed, the objective lens system at 1° tilt has OPD=12.6 m$\lambda$ from the A31 term, and OPD=44.2 m$\lambda$ from the A51 term i.e. the A31 contribution is smaller than the A51 contribution.

If we assume that the disk is tilted at approximately 0.1°, then we have an OPD=13.5 m$\lambda$ from the A31 term, and OPD=0.75 m$\lambda$ from the A51 term. If the objective lens system were to be tilted to compensate for the OPD arising from the A31 term i.e. to provide an OPD of 13.5 m$\lambda$ from the tilt of the lens system, then it will be appreciated that the system must be tilted in excess of 1°. Such a tilt will produce a relatively large amount of OPD arising from the orthogonal A51 term, (which at 1° is 44.2 mλ for the objective system), which is greatly in excess of the OPD from the disk A51 term. It will thus be appreciated that the conventional objective lens system can not be tilted so as to compensate simultaneously for both the coma arising from the A31 term disk tilt and the coma arising from the A51 term disk tilt.

In order to obtain a more tolerant system the present inventors propose to design an objective lens in such a way that the ratio of higher order coma versus third order coma as a function of oblique beam entrance substantially equals that arising when tilting the disk.

As a result, a substantial amount of lowest order coma with respect to higher order coma is generated when the beam enters the objective obliquely. In particular, in order to be tolerant for tilt misalignment of the objective, the amount of OPDrms (root mean square OPD) third order coma OPD (A31) and fifth order coma OPD (A51) generated by the objective at oblique entrances must comply with the relation $$\frac{OPD(A51)}{OPD(A31)} < 0.65 \qquad (1)$$

within the field of the lens system, where the sign of the Zernike coefficient A31 and A51 are the same. The field of the lens system is the area within which oblique beams generate an OPD of less than 15 mλ. The field of view of the lens system is twice the field.

An even better compensation arises when $$\frac{OPD(A51)}{OPD(A31)} < 0.4 \qquad (2)$$

where the sign of the Zernike coefficient A31 and A51 are the same.

Various embodiments of the invention will now be described, with reference to a respective conventional objective lens design.

EXAMPLE 1

Objective systems according to embodiments of the invention can also be used to compensate for disk tilt (for instance in rewriteable DVD drives) by using a tilting actuator concept. In order that warpage of the disk can be compensated significantly, the lower order coma OPD(A31) and higher order coma OPD(A51) arising due to disk tilt must substantially be respectively compensated by the coma and higher order coma arising due to tilting the objective (hence arising due to oblique entrance in the objective). In order to have an effective compensation, relation (1), or even better relation (2), must be fulfilled.

The objective lens 18 in FIG. 1, according to a first conventional design, is a plano-aspherical element. The objective lens 18 has a numerical aperture of 0.65 and an entrance pupil diameter of 3.58 mm, operating at wavelength λ=660 nm. The objective lens 18 has a thickness along the optical axis of 2.150 mm. The lens body of the objective lens is made of S-LAH66 OHARA glass (as produced by the Californian company OHARA Corporation) with refractive index n=1.768. The convex surface of the lens body, which in use is directed towards the collimator lens has a radius of 2.32 mm. The surface of the objective lens that faces the record carrier when in use is flat. The aspherical shape is realized in a thin layer of UV hardening acrylic lacquer (such as, for instance, described within U.S. Pat. No. 4,623,496) on top of the glass body. The lacquer has a refractive index of n=1.564. The thickness of this layer along the optical axis is 30 microns. The rotational symmetric aspherical shape is given by the equation:

$$z(r) = \sum_{i=1}^{5} B_{2i} r^{2i}$$

with z the position of the surface in the direction of the optical axis in millimetres, r the distance to the optical axis in millimetres, and $B_k$ the coefficient of the k-th power of r. The value of the coefficients $B_2$ to $B_{10}$ are 0.24451798, 0.0053871439, $-8.0244002 \ 10^{-5}$, $-2.4646422 \ 10^{-5}$, $1.1188561 \ 10^{-5}$, respectively. The free working distance (the distance between the objective lens 18 and the disk) is 1.160 mm. The cover layer of the disc has a thickness of 0.6 mm and a refractive index of n=1.580.

When tilting only the disk in such a system, the OPDrms of fifth order coma and third order coma are found to be $$\frac{OPD(A51)}{OPD(A31)} = 0.068 \qquad (3)$$

where for a 1 degree tilt the amount of third order coma is found to be 133 mλ.

When following the above described conventional design approach the ratio OPDrms of fifth order coma and third order coma is for oblique beam entrance found to be $$\frac{OPD(A51)}{OPD(A31)} = 3.51 \qquad (4)$$

where for a 1 degree field the amount of third order coma is found to be 12.6 mλ. Because of the significant difference between (3) and (4) the higher order coma can not significantly be cancelled by tilting the objective when the disk has a tilt misalignment. Taking 15 mλ as the limit, the field of view tolerance (i.e. twice the field) is given by 0.64 degrees in the nominal configuration. In other words, when the disk is not tilted, the maximum field of view angle at which an oblique beam can pass through the lens and obtain an OPD<15 mλ, is 0.64 degrees.

In this instance, the maximum disk tilt that can be compensated for by tilting the objective is a disk tilt of 0.39 degrees (i.e. the disk is tilted at an angle of 0.39° to the optical axis of the collimated radiation beam).

In this instance, due to the high value of (4) the allowed disk tilt is close to the allowed field (=0.5 times field of view) of the objective.

Thus here the lens surface is kept almost parallel to the disk to achieve compensation of disk tilt, whilst normally the lens surface will be at an angle to the disk when compensating for disk tilt.

The objective lens 18 in FIG. 1, in this first embodiment of the invention, is a plano-aspherical element. The objective lens 18 has a numerical aperture of 0.65 and an entrance pupil diameter of 3.58 mm, operating at wavelength λ=660 nm. The objective lens 18 has a thickness of 1.843 mm along the optical axis. The lens body of the objective lens is made of S-LAH66 OHARA glass with refractive index n=1.768. The convex surface of the lens body, which is directed towards the collimator lens when in use, has radius 2.32 mm. The surface of the objective lens that faces the record carrier when in use is flat. The aspherical shape is realized in a thin layer of UV hardening acrylic lacquer on top of the glass body. The lacquer has refractive index n=1.564. The thickness of this layer on the optical axis is 33 microns. The rotational symmetric aspherical shape is given by the equation:

$$z(r) = \sum_{i=1}^{5} B_{2i} r^{2i}$$

with z the position of the surface in the direction of the optical axis in millimeters, r the distance to the optical axis in millimeters, and $B_k$ the coefficient of the k-th power of r. The value of the coefficients $B_2$ to $B_{10}$ are 0.24672704, 0.0051164884, $-1.2805998 \ 10^{-4}$, $-4.1024615 \ 10^{-5}$, $-9.0856931 \ 10^{-6}$, respectively. The free working distance (the distance between the objective lens 10 and the disk) is 1.316 mm. The cover layer of the disc has a thickness of 0.6 mm and a refractive index of n=1.580.

When following the above-described first embodiment design, the ratio OPDrms of fifth order coma and third order coma is for oblique beam entrance found to be $$\frac{OPD(A51)}{OPD(A31)} = 0.61 \quad (5)$$

where for a 1 degree tilt the amount of third order coma is found to be 75.8 mλ. Note that (5) is now much closer to (3), indicating that the higher order contributions substantially compensate each other. Taking 15 mλ as the limit we find that the allowed disk tilt which can be compensated by tilting the objective is then 0.55 degrees, while the field of view tolerance is given by 0.34 degrees. The allowed disk tilt is now improved by 40%.

EXAMPLE 2

The objective lens 18 in FIG. 1, in this second embodiment of the invention, is a double-aspherical element. The objective lens 18 has a numerical aperture of 0.65 and an entrance pupil diameter of 3.58 mm, operating at wavelength λ=660 nm. The objective lens 18 has a thickness of 2.614 mm along the optical axis. The lens body of the objective lens is made of COC plastic with a refractive index of n=1.530. The front and back surfaces each have a rotational symmetric aspherical shape which is given by the equation:

$$z(r) = \sum_{i=1}^{5} B_{2i} r^{2i}$$

with z the position of the surface in the direction of the optical axis in millimetres, r the distance to the optical axis in millimetres, and $B_k$ the coefficient of the k-th power of r. The value of the coefficients for the front surface (i.e the surface facing the disk in use) are $B_2$ until $B_{16}$ are 0.27449755, 0.010768742, −0.0014658405, 0.0026677659, −0.0021173668, 0.00094500757, −0.00021921749, 2.0032412e-005, respectively.

The value of the coefficients for the back surface (i.e. the surface facing the collimator lens when in use) are $B_2$ to $B_{16}$ are −0.13747401, 0.067465541, −0.0550585, 0.04365398, −0.021116527, 0.00040009845, 0.0038992694, −0.0010731055, respectively.

The free working distance (the distance between the objective lens 10 and the disk) is 1.000 mm. The cover layer of the disc has a thickness of 0.6 mm and has refractive index of n=1.580.

When tilting the disk only, the OPDrms of fifth order coma and third order coma are found to be $$\frac{OPD(A51)}{OPD(A31)} = 0.068 \quad (6)$$

where for a 1 degree tilt the amount of third order coma is found to be 133 mλ. The ratio OPDrms of fifth order coma and third order coma for oblique beam entrance in the objective lens is found to be $$\frac{OPD(A51)}{OPD(A31)} = 0.359 \quad (7)$$

where for a 1 degree tilt the amount of third order coma is found to be 29.53 mλ. Taking 15 mλ as the limit we find that the allowed disk tilt is then 1.0 degrees, while the field of view tolerance is given by 0.9 degrees in the nominal configuration. The allowed disk tilt is now improved by 256% compared with the first conventional design lens described in example 1.

EXAMPLE 3

Increasingly, the overall dimensions of the optical systems are diminishing in size. This, along with the increase in recording density, requires precise assembly constraints, particularly in relation to the orientation of the objective lens. It is very difficult to precisely orientate small objective lenses during assembly.

One manner of circumventing the problem of the objective lens being incorrectly orientated (i.e. tilted) during assembly is to allow for a tilt misalignment of the objective lens, and to compensate for this misalignment by tilting the disk. This compensation by tilting the disk can be carried out during assembly of the optical pickup unit (i.e. by tilting the disk motor during assembly, the orientation of the motor determining the orientation of the disc).

The objective lens 18 in FIG. 1, according to a third embodiment design consists of two elements. Each element is plano-aspherical. The objective lens 18 has a numerical aperture of 0.85 and an entrance pupil diameter of 1.0 mm, operating at wavelength λ=405 nm. Both elements are made of COC (cyclic olefin copolymer) having a refractive index of n=1.550. The first element of the objective lens 18 facing the laser has a thickness along the optical axis of 0.40 mm, while the second element facing the disc is 0.527 mm thick. The distance between the two elements on the optical axis is 0.075 mm. The rotational symmetric aspherical shape of the first surface of the first element is given by the equation:

$$z(r) = \sum_{i=1}^{8} B_{2i} r^{2i}$$

with z the position of the surface in the direction of the optical axis in millimetres, r the distance to the optical axis in millimetres, and $B_k$ the coefficient of the k-th power of r. The value of the coefficients $B_2$ to $B_{16}$ are 0.52915187, −2.6064464, 59.745801, −728.17842, 5097.5432, −20502.8, 44013.121, −39077.168, respectively.

The rotational symmetric aspherical shape of the first surface of the second element is given by the equation:

$$z(r) = \frac{cr^2}{1 + \sqrt{1 - c^2 r^2}} + \sum_{i=1}^{8} D_{2i} \left(\frac{r}{r_0}\right)^{2i}$$

with z the position of the surface in the direction of the optical axis in millimetres, r the distance to the optical axis in millimetres, c the curvature of the surface, $r_0$ is the normalization radius and $D_k$ the coefficient of the k-th power of r. The value of c is 2.506 mm$^{-1}$, while $r_0$ is 0.5 mm. The value of the coefficients $D_2$ to $D_{16}$ are 0.3376384, −2.484319, 8.0824648, −7.2616424, −24.092634, 64.606397, −46.405224, respectively. The free working distance i.e. the distance between the objective lens 18 and the disk, is 0.075 mm. The cover layer of the disc has a thickness of 0.1 mm and a refractive index of n=1.622.

When tilting only the disk in such a system, the OPDrms of fifth order coma and third order coma are found to be $$\frac{OPD(A51)}{OPD(A31)} = 0.078 \quad (8)$$

where for a 1 degree tilt the amount of third order coma is found to be 108.5 mλ.

When following the above third embodiment design approach, the ratio OPDrms of fifth order coma and third order coma for an oblique beam entrance is found to be $$\frac{OPD(A51)}{OPD(A31)} = 0.578 \quad (9)$$

where for a 1 degree field the amount of third order coma is found to be 66.1 mλ. Because of the significant difference between (8) and (9) the higher order coma can be moderately be cancelled by tilting the disk (condition (1) fulfilled) when the objective has a tilt misalignment. Taking 15 mλ as the limit of aberration, we find that the allowed tilt misalignment of the objective is then 0.45 degrees, while the field of view tolerance is given by 0.4 degrees.

Similarly, the objective lens 18 in FIG. 1, in a fourth embodiment of the invention, consists of two elements. Each element is plano-aspherical. The objective lens 18 has a numerical aperture of 0.85 and an entrance pupil diameter of 1.0 mm, operating at wavelength λ=405 nm. Both elements are made of COC having a refractive index of n=1.550. The first element of the objective lens 18 facing the laser has a thickness along the optical axis of 0.40 mm, while the second element facing the disc is 0.444 mm thick. The distance between the two elements on the optical axis is 0.075 mm. The rotational symmetric aspherical shape of the first surface of the first element is given by the equation:

$$z(r) = \sum_{i=1}^{8} B_{2i} r^{2i}$$

with z the position of the surface in the direction of the optical axis in millimeters, r the distance to the optical axis in millimetres, and $B_k$ the coefficient of the k-th power of r. The value of the coefficients $B_2$ to $B_{16}$ are 0.67904917, −0.73827467, 22.022311, −296.67572, 2236.389, −9564.7477, 21643.036, −20152.291, respectively. The rotational symmetric aspherical shape of the first surface of the second element is given by the equation:

$$z(r) = \frac{cr^2}{1 + \sqrt{1 - c^2 r^2}} + \sum_{i=1}^{8} D_{2i} \left(\frac{r}{r_0}\right)^{2i}$$

with z the position of the surface in the direction of the optical axis in millimetres, and r the distance to the optical axis in millimetres, c the curvature of the surface, $r_0$ is the normalization radius and $D_k$ the coefficient of the k-th power of r. The value of c is 2.480 mm$^{-1}$, while $r_0$ is 0.5 mm. The value of the coefficients $D_2$ to $D_{16}$ are 0.20750918, −2.667102, 16.934987, −61.236377, 124.45225, −133.28039, 57.151524, respectively. The free working distance (the distance between the objective lens 10 and the disk) is 0.075 mm. The cover layer of the disc has a thickness of 0.1 mm and a refractive index of n=1.622.

When following the above fourth embodiment design, the ratio OPDrms of fifth order coma and third order coma for oblique beam entrance is found to be $$\frac{OPD(A51)}{OPD(A31)} = 0.207 \quad (10)$$

where for a 1 degree field the amount of third order coma is found to be 142.7 mλ. Note that (10) is now much closer to (8), indicating that the higher order contribution substantially compensate each other. Taking 15 mλ as the limit, we find that the allowed tilt misalignment of the objective is then 0.8 degrees, while the field of view tolerance is given by 0.2 degrees. The allowed tilt misalignment is now improved by almost a factor of two.

It will be appreciated that different embodiments of the present invention can be applied in relation to a variety of lens systems. Preferably, embodiments are utilised in respect of lens systems that have a Numerical Aperture of greater than 0.7. Preferably, lens systems in accordance with embodiments have an entrance pupil diameter of less than 2 mm, and even more preferably, less than 1.5 mm. Preferably, embodiments are utilised in conjunction with radiation beams having a wavelength less than 600 nm, including beams having wavelengths of approximately 405 nm.

In view of the above examples, it will be appreciated that embodiments of the invention can be used to improve the assembly of optical systems such as Small optical drives, or to allow disk tilt compensation when using a tilt actuator (for instance, in rewriteable DVD drives).

The invention claimed is:

1. An optical scanning device (1) for scanning an information layer (4) of an optical record carrier (2), the device (1) comprising a radiation source (11) for generating a radiation beam (12, 15, 17, 20) and an objective system (18) for converging the radiation beam on the information layer, the objective system (18) being characterised in that the ratio of the root mean square of the optical path difference's (OPD's) generated by the objective system at oblique beam entrance to the system satisfies the condition:

$$\frac{OPD(A51)}{OPD(A31)} < 0.65$$

within the field of the objective system (18), where OPD(A31) is the contribution of the third order Zernike coma to the root mean square wavefront aberration and OPD(A51) is the contribution of the fifth order Zernike coma to the root mean square wavefront aberration.

2. A device (1) as claimed in claim 1, wherein the values of OPD (A31) and OPD (A51) satisfy the condition $$\frac{OPD(A51)}{OPD(A31)} < 0.4.$$

3. A device (1) as claimed in claim 1, the device further comprising a detection system (25, 27) for converting radiation coming from the information layer to an information signal, and an information processing unit (29) for error correction of the information signal.

4. A device (1) as claimed in claim 1, further comprising an actuating unit arranged to tilt at least one of the objective system (18) and the optical record carrier (2).

5. A lens system (18) comprising at least one lens for focusing a radiation beam, characterised in that the ratio of the root mean square of the optical path difference's (OPD's) generated by the lens system at oblique beam entrance to the system satisfies the condition:

$$\frac{OPD(A51)}{OPD(A31)} < 0.65$$

within the field of the lens system, where OPD(A31) is the contribution of the third order Zernike coma to the root mean square wavefront aberration and OPD(A51) is the contribution of the fifth order Zernike coma to the root mean square wavefront aberration.

6. A lens system (18) as claimed in claim 5, wherein said system is an objective system.

7. A lens system (18) as claimed in claim 5, the system comprising at least a first and a second lens.

8. A method for manufacturing a lens system (18) comprising at least one lens for focusing a radiation beam (17), the method comprising the step of:
forming said lens system such that the ratio of the root mean square of the optical path difference's (OPD's) generated by the lens system at oblique beam entrance to the system satisfies the condition:

$$\frac{OPD(A51)}{OPD(A31)} < 0.65$$

within the field of the lens system, where OPD(A31) is the contribution of the third order Zernike coma to the root mean square wavefront aberration and OPD(A51) is the contribution of the fifth order Zernike coma to the root mean square wavefront aberration.

9. A method as claimed in claim 8, the method further comprising the step of designing the lens system (18) so as to satisfy said condition.

10. A method of manufacturing an optical scanning device (1) for scanning an information layer (4) of an optical record carrier (2), the method comprising the steps of:
providing a radiation source (11) for generating a radiation beam;
providing a lens system (18) for converging the radiation beam on the information layer (4), the lens system (18) being characterised in that the ratio of the root mean square of the optical path difference's (OPD's) generated by the lens system at oblique beam entrance to the system satisfies the condition:

$$\frac{OPD(A51)}{OPD(A31)} < 0.65$$

within the field of the lens system, where OPD(A31) is the contribution of the third order Zernike coma to the root mean square wavefront aberration and OPD(A51) is the contribution of the fifth order Zernike coma to the root mean square wavefront aberration.

11. A method as claimed in claim 10, further comprising the step of providing a unit for holding a record carrier (2) at a predetermined angle with respect to the lens system (18), the predetermined angle being such that coma arising in the beam due to the record carrier at least partially compensates for the coma arising in the beam passing through the lens system.

* * * * *